United States Patent [19]

Mihály et al.

[11] 4,038,772

[45] Aug. 2, 1977

[54] FISHING ROD WITH AN IMPROVED BITE DETECTOR ARRANGEMENT

[76] Inventors: Németh Mihály, Kalaszi u. 22, H-1039 Budapest; Honthegyi Mátyás, Zarand u. 10, H-1031 Budapest, both of Hungary

[21] Appl. No.: 674,402

[22] Filed: Apr. 7, 1976

[30] Foreign Application Priority Data

Feb. 20, 1976 Hungary .............................. HO 1882

[51] Int. Cl.² ............................................ A01K 97/12
[52] U.S. Cl. .................................................... 43/17
[58] Field of Search .......................... 43/17, 24, 25, 16

[56] References Cited

U.S. PATENT DOCUMENTS 2,657,493  11/1953  Coles ........................................ 43/16

FOREIGN PATENT DOCUMENTS

| | | | |
|---|---|---|---|
| 1,003,095 | 9/1965 | United Kingdom ..................... | 43/17 |
| 871,943 | 7/1961 | United Kingdom ..................... | 43/17 |
| 966,140 | 8/1964 | United Kingdom ..................... | 43/17 |
| 1,286,242 | 8/1972 | United Kingdom ..................... | 43/17 |
| 1,412,953 | 11/1975 | United Kingdom ..................... | 43/17 |

*Primary Examiner*—Warner H. Camp
*Attorney, Agent, or Firm*—Ernest F. Marmorek

[57] ABSTRACT

A tipping tube is pivotally mounted to the fishing rod at an end region, a slide-weight mounted onto the tipping tube, a signalling means placed at the other end region of the tipping tube and laterally extending out from the tipping tube, and a supporting means releasably engaging the moving end of the tipping tube to keep it with a predetermined force in a rest position in which the axis of the tipping tube is substantially parallel to the fishing rod.

The fishing line is led through the tipping tube and in operation the inclination of the tipping tube is determined by the tension in the fishing line and the position of the slide-weight. The movement of the signalling means provides a perceptible display of the bite.

3 Claims, 8 Drawing Figures

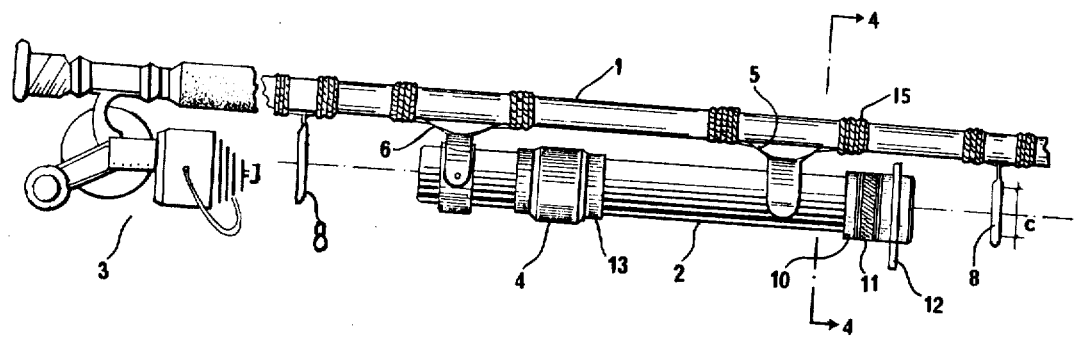
FIG. 1
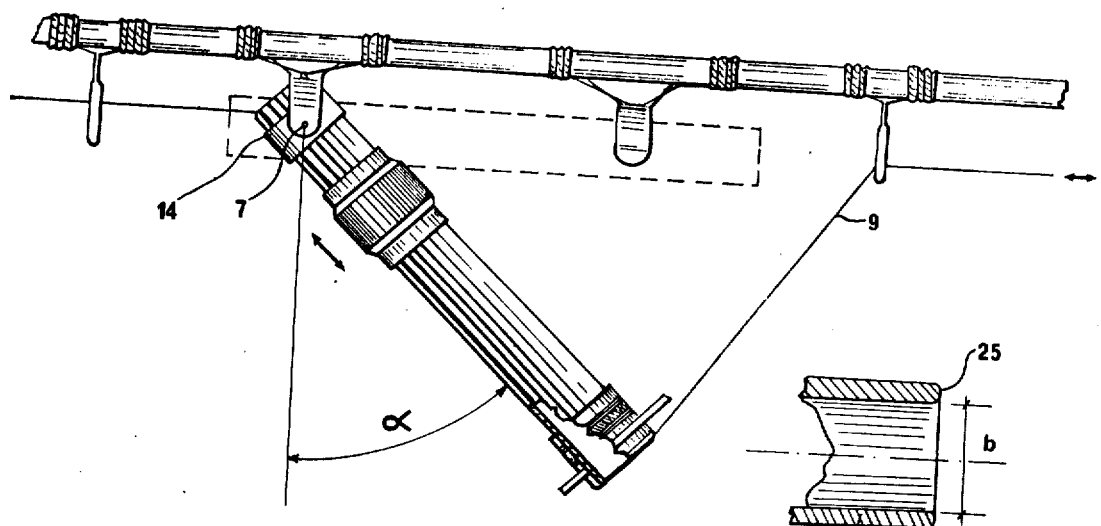
FIG. 2
FIG. 7
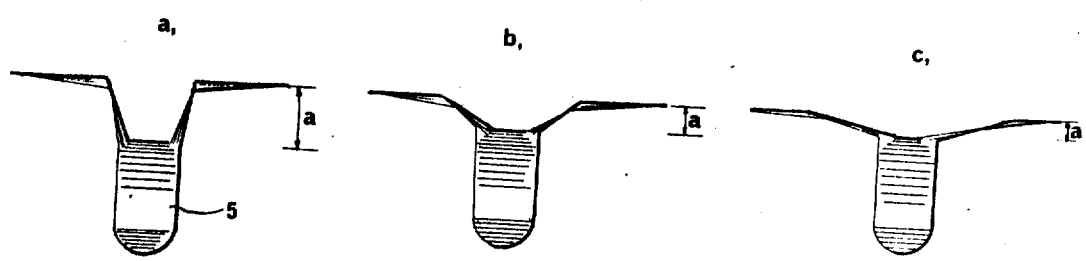
FIG. 3

FISHING ROD WITH AN IMPROVED BITE DETECTOR ARRANGEMENT

The invention relates to a fishing rod with an improved bite detector arrangement which is particularly useful at bottom fishing or ledgering.

Bite detector arrangements are used to provide a perceptible signal when even the slightest forces are exerted on the fishing line, whereas they must not disturb the fishing. Besides this main task or requirement bite detectors must have an adjustable sensitivity which depend on the throwing distance and on the thickness of the line.

Bite detector arrangements which are used for ledgering or bottom fishing are usually mounted on the fishing rod and they are removed for bobber fishing. The repeated process of mounting and removal proved to be inconvenient work therefore such constructions are generally not preferred.

In the British patent specification No. 1,003,095 a bite detector is described, having a great disadvantage according to which the position of the assembly is not fixed during throwing, biting and fish-exhausting and the freely moving bite detector makes the guidance of the fishing line unstable and disturbs the fisherman. According to a further disadvantage of this construction the signalling is achieved by a signalling arm which moves perpendicular with respect to the rod and this movement is hardly perceptible and the arm can easily be entangled by the line at throwing or when the line is being pulled back.

The object of the invention is to provide an improved bite detector arrangement which can permanently be mounted onto the fishing rod, which can not disturb the fishing and which can provide a well perceptible signal that is proportional to the force exerted onto the line, furthermore, which has an adjustable signalling sensitivity depending on the throwing distance and on the line thickness.

The bite detector arrangement comprises according to the invention a pivoted supporting shackle which can be affixed to the fishing rod; a tipping tube connected tiltably at one of its ends to the pivoted supporting shackle; a signalling means located on the tipping tube and adapted to signal the tilting movement of this tube; a slide-weight having an adjustable position along the length of the tipping tube, a supporting member engaging the free end of the tipping tube and the engagement is broken at a predetermined releasing pressure, wherein the fishing line is threaded through the longitudinal hole of the tipping tube; and the inside diameter of the tipping tube being at least as great as the diameter of one of the adjacent guiding rings.

The invention will now be described by way of example in connection with some preferred embodiments in which reference is made to the accompanying drawings. In the drawings:

FIG. 1 is a fragmentary elevational view showing the invented bite detector arrangement mounted onto a fishing rod in which the tipping tube is in a fixed position;

FIG. 2 is a fragmentary elevational view similar to FIG. 1 showing the tipping tube at operational or signalling position;

Figure 4:
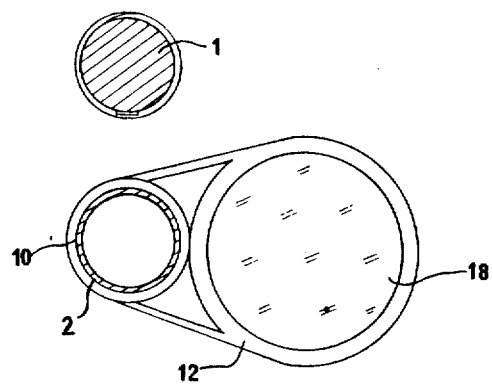
Figure 5:
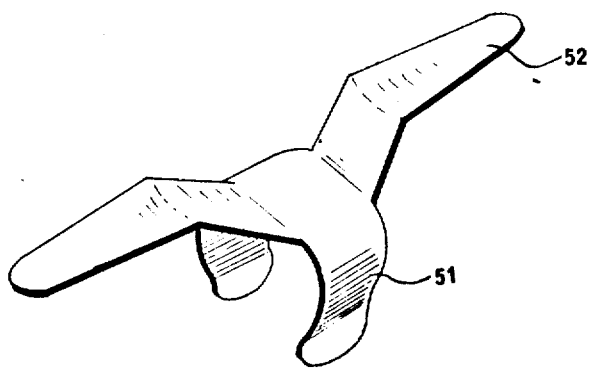
Figure 6:
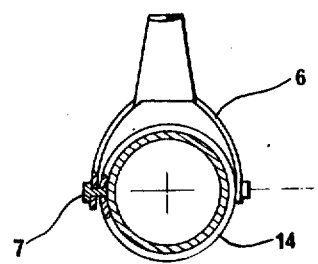
Figure 8:
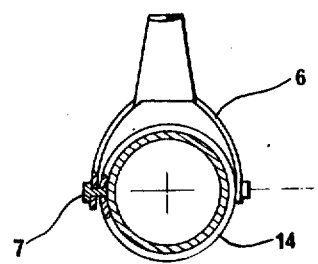

FIG. 3 a, b and c are elevational detail views showing the position adjustment of the bite detector arrangement;

FIG. 4 is a fregmentary sectional view taken along the line 4—4 shown in FIG. 1 illustrating the design of the signalling means;

FIG. 5 is a perspective view showing a bracket spring used for fixing the moving end of the tipping tube;

FIG. 6 is an elevational view, partly in section, showing a magnetic way of fixing the moving end of the tipping tube;

FIG. 7 is a large scale fragmentary sectional view showing the end part of the tipping tube; and FIG. 8 is a simplified side-elevational view, partly in section, showing the connection between the pivoted supporting shackle and the tipping tube.

FIGS. 1 and 2 show a conventional fishing rod 1 and the bite detector arrangement of the present invention is mounted onto the fishing rod 1 between two adjacent fishing line guiding rings 8. The bite detector arrangement comprises substantially a pivoted supporting shackle 6, a tipping tube 2, a slide-weight 4, a signalling means 12 and a bracket spring 5.

The bite detector arrangement is placed between two adjacent line guiding rings 8 in a position at which the pivoted supporting shackle 6 faces towards the handle of the fishing rod. The tipping tube 2 can freely be turned within the plane of the fishing rod 1 around the fulcrum 7 of the pivoted supporting shackle 6. The moving end of the tipping tube 2 engages the bracket spring 5 (FIGS. 3 and 5). The arms 51 of the bracket spring 5 exert a predetermined force onto the tipping tube 2 placed therebetween and this force keeps the tipping tube 2 in the rest position shown in FIG. 1. At this rest position the bite detector arrangement can not disturb the conventional use of the fishing rod. The biasing force of the bracket spring 5 is adjusted so that the engagement with the tipping tube 2 is broken at pulling forces ranging between 50 to 100 grams and thereafter the tube can be tilted into the signalling position shown in FIG. 2. The clamping force of the bracket spring 5 is sufficient to keep the tipping tube 2 in the rest position during throwing and exhausting the fish.

The tipping tube 2 having preferably a circular cross section and its inner diameter "b" (FIG. 7) is greater or equal to the diameter "c" of the smaller of the adjacent guiding rings 8 (FIG. 1) so that at the rest position there can be no friction between the tipping tube 2 and the fishing line 9 threaded therethrough. The tipping tube 2 is made preferably of an alloyed aluminum tube having rounded edges 25 (FIG. 7) to prevent the fishing line from getting worn. The whole surface of the tipping tube but at least the areas including the rounded edges 25 are electrolytically oxidized (electroplated) to ensure sufficient surface hardness and wear resistance.

The slide ring 4 is mounted on the tipping tube 2 and it can be axially moved thereon. The slide ring 4 is made of stainless steel having a weight between 2 and 6 grams, preferably 3 grams and the inner diameter of the slide ring 4 fits to the outer diameter of the tipping tube with a slight radial play. The slide ring 4 is supported at both sides by two plastic clamping rings 13. The clamping rings 13 are made of an elastic plastic material such as soft polyethylene and engage the tipping tube 2 with a predetermined clamping force. This clamping force is adjusted so that the slide ring 4 together with the clamping rings 13 can move along the tipping tube 2 if an axial force of 0.2 to 0.8 kp is exerted onto one of the rings 13. At such adjustment of the clamping forces there can be no accidental shift in the position of the slide ring 4 even at throwing.

The way of engagement between the pivoted supporting shackle 6 and the tipping tube 2 is illustrated in FIG. 8. There is affixed onto the rear and of the tipping tube 2 a shackle holding ring 14 which is preferably made of an elastic plastic material. The shackle holding ring 14 carries on its two diametrically opposing sides two fulcrums. The two arms of the pivoted supporting shackle 6 are in engagement with the two respective fulcrums 7 so that the tipping tube 2 can be freely turned around the axis defined by the two fulcrums 7. The bottom parts or legs of the pivoted supporting shackle 6 and the bracket spring 5 are of identical design. These bottom parts can be affixed to the fishing rod 1 by means of known methods, for example by using binding cords 15. The binding cords 15 can of course be replaced by any kinds of appropriate elements such as rings, brackets, etc.

The tipping tube 2 must be mounted onto the fishing rod 1 in such a position at which its axis falls in the line connecting the center points of the two adjacent line guiding rings 8. At this position the fishing line 9 threaded through the tipping tube 2 can surely not touch the tipping tube 2 at its rest position. The height adjustment can be done by pressing the bottom parts of the pivoted supporting shackle 6 and of the bracket spring 5 towards or away from each other. FIG. 3 shows that by adjusting the distance between said bottom parts, the height "a" is also changed whereby the tipping tube 2 can be brought into the required position.

There are mounted onto the tipping tube signalling rings 10 and 11 and a signalling means 12 to display the tilting movement of the tube 2. The signalling elements must be placed near to the moving end of the tipping tube because the maximum displacement is here. The signalling rings 10 and 11 are of similar design. In the embodiment shown in FIG. 1 three signalling rings are used, of which the two outer rings 10 are white and the middle ring 11 is bright red. The colors should be selected so as to give a perceptible view even if it is getting dark.

It must be taken into account that the fishing rod 1 can easily conceal or cover the signalling rings 10 and 11 from the view of the fisherman. Therefore it is of great importance that the signalling means 12 laterally extend out from the shadow of the fishing rod. FIG. 4 shows that the signalling means 12 is laterally extended out from the plane that includes the axes of the fishing rod 1 and of the tipping tube 2. The signalling means 12 is made of an elastic plastic material and comprises a ring shaped bottom part and a signalling plate extending out from the bottom part. The surface of the signalling plate which faces towards the handle of the fishing rod 1 is of striking design. This striking design may comprise color patterns or figures using bright colors or preferably a light reflecting member 18 attached to said surface. The light reflecting member 18 can be a reflecting paint used at traffic tables, a fiber glass textile material, a mirror or any other material which has a striking color and a great light reflection.

According to another preferred embodiment of the invention the tipping tube 2 is held in the rest position by a magnetical catching means instead of the bracket spring 5. FIG. 6 shows this embodiment wherein adjacent to the free end of the tipping tube 2 a soft-iron member 21 is placed in a clamping foot 20. In a position opposite to the soft--iron member 21 a permanent magnet piece 24 is mounted to the fishing rod 1 by means of clamping foot 23. The force that arises between the soft-iron member 21 and the permanent magnet piece 24 keeps the tipping tube 2 in the rest position. In this embodiment the position of the clamping feet 20 and 23 can be fixed by means of binding or clamping rings 22.

The bite detector arrangement according to the invention can be operated as follows:

Before throwing the line with the hook into the water the bite detector should be put into a rest position shown in FIG. 1 in which the fishing line 9 is threaded through the tipping tube 2 without touching it. In this way there can be no friction between the tipping tube 2 and the fishing line 9, thus the bite detector can not exert any influence on the throwing distance.

After throwing, the tipping tube 2 shoud be released from the bracket spring 5 whereby it will assume the operating position shown in FIG. 2.

The angular position of the tipping tube is determined during operation by the momentary stress condition of the fishing line which is balanced by the slide-weight 4. The magnitude of the torque relating to the fulcrum 7 can be changed within a comparatively wide range by sliding the slide-weight 4 along the tipping tube 2.

In order to illustrate the effect of this adjustment the following data relate to an exemplary embodiment wherein the outer diameter of the tipping tube 2 is 12 mm, its inner diameter is 10 mm, its full length is 115 mm, while the weight of the slide weight 4 is 2.5 grams.

The minimum distance between the middle-line of the slide-weight 4 and the fulcrum 7 is 10 mm and its maximum distance is 80 mm, thus the median distance is 45 mm. If the slide-weight is adjusted to the minimum distance from the fulcrum, then the angular position 2 of the tipping tube 2 depends on the pulling force exerted on the line 9 and this relationship is illustrated by the following table.

| Pulling force in grams | 0 | 1 | 1.6 | 2.6 | 5 | 7 | 10 | 13.5 |
|---|---|---|---|---|---|---|---|---|
| Tilting angle (a °) | 0 | 12 | 15 | 45 | 60 | 70 | 72 | 75 |

It can be understood that angular positions exceeding 75° correspond to rapidly increasing pulling forces.

Depending on the position of the slide-weight 4 the bite detector arrangement can be used for different throwing distances and with different line sizes. The following table shows the optimum data corresponding to minimum, median and maximum slide-weight distances.

| Chosen line-diameter (mm) | | Throwing distance in meters at the following weight positions | | |
|---|---|---|---|---|
| minimum | maximum | minimum (10 mm) | median (45 mm) | maximum (80 mm) |
| 0.20 | 0.30 | 25–30 | 30–40 | 40– |
| 0.32 | 0.40 | 15–20 | 20–35 | 40– |
| 0.45 | 0.50 | –15 | 15–25 | 25–35 |

Naturally the data given in the above table are only informal. After throwing the line into the water the bite detector arrangement should be adjusted by stressing the line (with the aid of the bobbin 3 shown in FIG. 1) so that the angle α take a value of about 15°. This is an advatageous adjustment because if the fish bites towards the fishing rod, then the bite detector turns towards the vertical position showing this way immediately the direction of the bite, whereby the pulling operation can take place without delay. Most of the bites, however, occur in a direction showing away from the fishing rod. This eventually is also displayed by the upwardly directed movement of the tipping tube and the signalling means mounted thereto. With the described geometric design the signalling operation takes place in a visually well perceptible way wherein the turning distance is nearly proportional with the tension of the line. Practical tests have shown that the way of movement of the bite detector is very characteristic to the fish-type.

The pulling operation must be started when the bite detector reaches an angular position of about 15 to 30° with respect to the horizon, or when the fish bites towards the rod, the line must be pulled out at once.

The novel bite detector can well be used for bottom fishing in the evening or also in the night because the mirror like signalling surface provides a perceptible signalling even at the slightest movement of the tipping tube 2. The bite detector arrangement can permanently be mounted on the fishing rod because it can not disturb the use of the fishing rod for other types of fishing. When the arrangement is in a rest position it acts as if it were only a guide ring. When the line is being pulled out, the tipping tube moves into the rest position whereinafter it can not disturb the fisherman in pulling out the fish.

Of course the invention is not limited to any one of the above described exemplary embodiments because it can well be used also with similar other embodiments. For instance a longitudinal scale can be provided on the surface of the tipping tube which can facilitate the way of adjustment. In accordance with another embodiment a signalling lamp can be mounted onto the fishing rod or onto the bite detector and in night-fishing the signalling means 12 reflects the light of the lamp providing in this way a very good display.

What is claimed is:

1. A bite detector arrangement for fishing rods, comprising a tipping tube for guiding the fishing line when led therethrough; a pivoted supporting means pivotally supporting an end region of said tipping tube; a supporting member releasably engaging the other end region of said tipping tube in which said engagement being released at opening forces exceeding a predetermined value; a slide-weight placed onto the tipping tube and being adjustable along the length of the tipping tube; a signalling means mounted onto the tipping tube; and said pivoted supporting means and said supporting member having foot-parts having adjustable heights.

2. The bite detector arrangement as claimed in claim 1, wherein said signalling means being made of an elastical plastic material and comprising a ring-shaped bottom part attached to said tipping tube, and a signalling plate connected to said bottom part and the plane of said plate being substantially perpendicular to the axis of said tipping tube and the side of said plate facing towards said pivoted supporting means comprising a visually perceptible surface structure.

3. The bite detector arrangement as claimed in claim 2 wherein a light reflecting member is attached to said side of the signalling plate.

* * * * *